United States Patent [19]
Fujii et al.

[11] Patent Number: 5,598,283
[45] Date of Patent: Jan. 28, 1997

[54] SHORT CIRCUIT LINE HAVING A CONDUCTIVE EXTENSION BETWEEN GROUPS OF TERMINALS IN A LIQUID CRYSTAL DISPLAY DEVICE

[75] Inventors: Yoshiharu Fujii, Sagamihara; Toshihiko Yoshida, Yokohama; Hiroaki Kitahara, Hachiouji, all of Japan

[73] Assignee: International Business Machines Corporation, Armonk, N.Y.

[21] Appl. No.: 263,094

[22] Filed: Jun. 21, 1994

[30] Foreign Application Priority Data

Jun. 21, 1993 [JP] Japan ................................. 5-148762

[51] Int. Cl.⁶ .......................... G02F 1/1343; G02F 1/1345
[52] U.S. Cl. .............................. 349/143; 349/153
[58] Field of Search ................................ 359/54, 59, 87, 359/88

[56] References Cited

U.S. PATENT DOCUMENTS

| | | | |
|---|---|---|---|
| 5,019,001 | 5/1991 | Abe et al. | 445/3 |
| 5,283,677 | 2/1994 | Sagawa et al. | 359/88 |
| 5,373,377 | 12/1994 | Ogawa et al. | 359/59 |

Primary Examiner—Anita Pellman Gross
Assistant Examiner—Walter J. Malinowski
Attorney, Agent, or Firm—Jay P. Sbrollini; James E. Murray

[57] ABSTRACT

To prevent dielectric breakdown for a storage capacitor of a liquid crystal display element connected to a predetermined gate line in a liquid crystal display device. In a liquid crystal display device including a display region in which a plurality of liquid crystal display elements are formed in a matrix and a peripheral region enclosing the display region, wherein the display region includes a plurality of gate lines arranged in parallel with one another and a plurality of reference voltage lines each of which is formed between the gate lines and serves as an electrode for a storage capacitor of each of the liquid crystal display elements and said peripheral region includes a plurality of connecting terminals which are separated from each other by a distance smaller than a distance between adjacent gate lines in the display region, the connecting terminals are arranged in a plurality of groups, said gate lines are each connected to the connecting terminals, and a short-circuit line is formed along the peripheral region so that the connecting terminals are short-circuited, a conductor extended from said short-circuit line is formed between a region between said groups and the reference voltage lines which face the region.

10 Claims, 6 Drawing Sheets

SHORT CIRCUIT LINE HAVING A CONDUCTIVE EXTENSION BETWEEN GROUPS OF TERMINALS IN A LIQUID CRYSTAL DISPLAY DEVICE

TECHNICAL FIELD

The present invention relates to a liquid crystal display device in which gate and data lines are formed on a transparent insulating substrate so that they cross each other and a liquid crystal display element including a switching transistor and an electrode is formed at each of the intersections of the gate and data lines.

BACKGROUND ART

A liquid crystal display device is widely used as a display device in a personal computer, a word processor, etc. The liquid crystal display device includes two glass substrates and a liquid crystal material held between them. On one glass substrate gate and data lines are formed so that they cross each other and a liquid crystal display element including a switching transistor and a display electrode is formed at each of the intersections of the gate and data lines. On the other glass substrate, a common electrode, a color filter, etc. are formed.

FIG. 3 shows one glass substrate 31 and the other substrate 32 described above. The glass substrate 31 is divided into a display region 33 and a peripheral region 34 and gate lines 35 and data lines 36 are formed in the display region 33.

Formed in the peripheral region 34 are gate line connecting terminals 37 which are separated from each other by a distance L2 smaller than a distance L1 between adjacent gate lines in the display region, data line connecting terminals 38 which are separated from each other by a distance L4 smaller than a distance L3 between the data lines in the display region, and a short-circuit line 47 for causing all connection terminals to be short-circuited.

The gate and data line connecting terminals 37 and 38 are arranged in a plurality of groups 37A, 37B, etc. and 38A, 38B, etc. and regions 39 and 40 each exist between adjacent groups. In the regions 39 and 40 positioning marks (not shown) for connecting a flexible circuit board to the connecting terminals 37 and 38 are formed. The short-circuit line 47 on the glass substrate 31 is removed by cutting it along lines 41 after both glass substrates 31 and 32 are overlapped.

FIG. 4 is an enlarged diagram for a section enclosed by dotted lines 42 in FIG. 3. Formed between the adjacent gate lines 35 are reference voltage lines 43A, 43B, and 43C. Formed at each of the intersections of the gate and data lines 35 and 36 is a liquid crystal display element 44.

The glass substrates 31 and 32 are sealed with a seal 48. The reference voltage lines 43A, 43B, and 43C each have connection parts 50A, 50B, and 50C. The connection sections 50A, 50B, and 50C are connected to a connection line 49 through openings 51A, 51B, and 51C formed on an insulating layer which covers the entire surface of the glass substrate 31. The connection line 49 is connected to the reference voltage lines.

An equivalent circuit of the liquid crystal display element 44 is shown in FIG. 4. The liquid crystal display element 44 comprises a thin-film transistor 56, an ITO electrode 54, a common electrode 57 and an ITO layer which are all formed on the glass substrate 32, as is the reference voltage line 43B. A liquid crystal material exists between the ITO electrode 54 and the reference voltage line 43, and the ITO electrode 54, the reference voltage line 43, and the insulating layer comprise a storage capacitor.

A cross section taken along line 5—5 is shown in FIG. 5 and a cross section taken along line 6—6 is shown in FIG. 6. Referring to FIG. 5, on the glass substrate 31 a gate electrode 35, an insulating layer 51, and a semiconductor layer, for example, an amorphous-silicon layer 52 are formed in this order. The ITO electrode 54, which is a display electrode is then formed. In addition, a source electrode 36, which is the extension of the data line, and a drain electrode 53 are formed. Part of the semiconductor layer 52 between the source and drain electrodes 36 and 53 is a channel region of the thin-film transistor.

Referring to FIG. 6, the gate line 35 and the reference voltage line 43B are formed simultaneously on the glass substrate. As described above, the ITO electrode 54 is then formed on the insulating layer. The reference voltage line 43B, the insulating layer 51, and the ITO 54 corresponding to a section 55 comprise the storage capacitor of the liquid crystal display element 44.

The present invention is intended to solve a problem which occurs in a liquid crystal display device having the construction described above. In the liquid crystal display device, a line defect or a point defect is caused by various factors in the manufacturing processes. With respect to such defects, it has been clear that a point defect is caused particularly in the liquid crystal display element connected only to the gate line 35B above the region 39 in FIG. 4. The cause of this defect was unknown.

The present inventors have finally found that the point defect differs from various other defects and is caused by the discharge of electric charges stored on the region 39 in FIG. 3 and FIG. 4 onto the reference voltage line 43B. In the following, such discharge is described by reference to FIG. 7. In the first manufacturing process, the gate lines 35A to 35D, the gate line connecting terminals 37, the reference voltage line 43A to 43C, the connection sections 50A to 50C, and the short-circuit line 47 are formed simultaneously on the glass substrate 31. The insulating layer 51 shown in FIG. 5 and FIG. 6 is then formed over the surface. Then the semiconductor layer 52 and the ITO 54 are finally formed. In this stage, a construction of the storage capacitor shown in FIG. 6 is completed. As shown in FIG. 7, the gate lines 35A, 35B, and 35C are now connected to one another through the short-circuit line 47. On the other hand, the reference voltage lines 43A, 43B, and 43C are not tied to any potential, that is, they are floating. The region 39 shown in FIG. 7 is larger than a region 58 since the positioning marks (not shown) for connecting the flexible circuit board are formed, as described above. The region 39 is approximately one hundred times as large as the region 58. Accordingly, electrostatic charge formed by static friction, etc. in the manufacturing process is large for the region 39 and small for the region 58. Electrostatic charges stored on the region 39 are discharged onto the gate lines 35B and 35C and the reference voltage line 43B. The gate lines 35B and 35C are connected to each other through the short-circuit line 47 and offer large capacitance, which allows large electrostatic charges to be absorbed in the large capacitance, so that dielectric breakdown does not occur even if such discharge is present. On the other hand, the reference voltage line 43B offers small capacitance, which causes the insulating layer 51 for the storage capacitor 55 (part of which is formed by the reference voltage line 43B) to experience dielectric breakdown due to such discharge. As described above, the storage capacitor of the liquid crystal display element connected to the gate line 35B experiences dielectric breakdown and a point defect is caused, accordingly.

According to the present invention, in a liquid crystal display device including a display region in which a plurality of liquid crystal display elements are formed in a matrix and a peripheral region enclosing the display region, wherein said display region includes a plurality of gate lines arranged in parallel with one another and a plurality of reference voltage lines each of which is formed between the gate lines and serves as an electrode of a storage capacitor of each of said liquid crystal display elements, and said peripheral region includes a plurality of connecting terminals which are separated from each other by a distance smaller than a distance between adjacent gate lines in said display region, said connecting terminals are arranged in a plurality of groups, said gate lines are each connected to said connecting terminals, and a conductive short-circuit line is formed along said peripheral region so that said connecting terminals are short-circuited, the improvement comprises a conductor extending from said conductive short-circuit line between a region between said groups and said reference voltage lines which face the region.

Said conductive short-circuit line, said gate lines, said reference voltage lines, and said conductor are formed on a glass substrate.

Said conductive short-circuit line, said gate lines, said reference voltage lines, and said conductor are made of a metallic material selected from the group consisting of an alloy of tantalum and molybdenum, tantalum, aluminum, and chromium.

DETAILED DESCRIPTION OF THE PREFERRED EMBODIMENT

Figure 1:
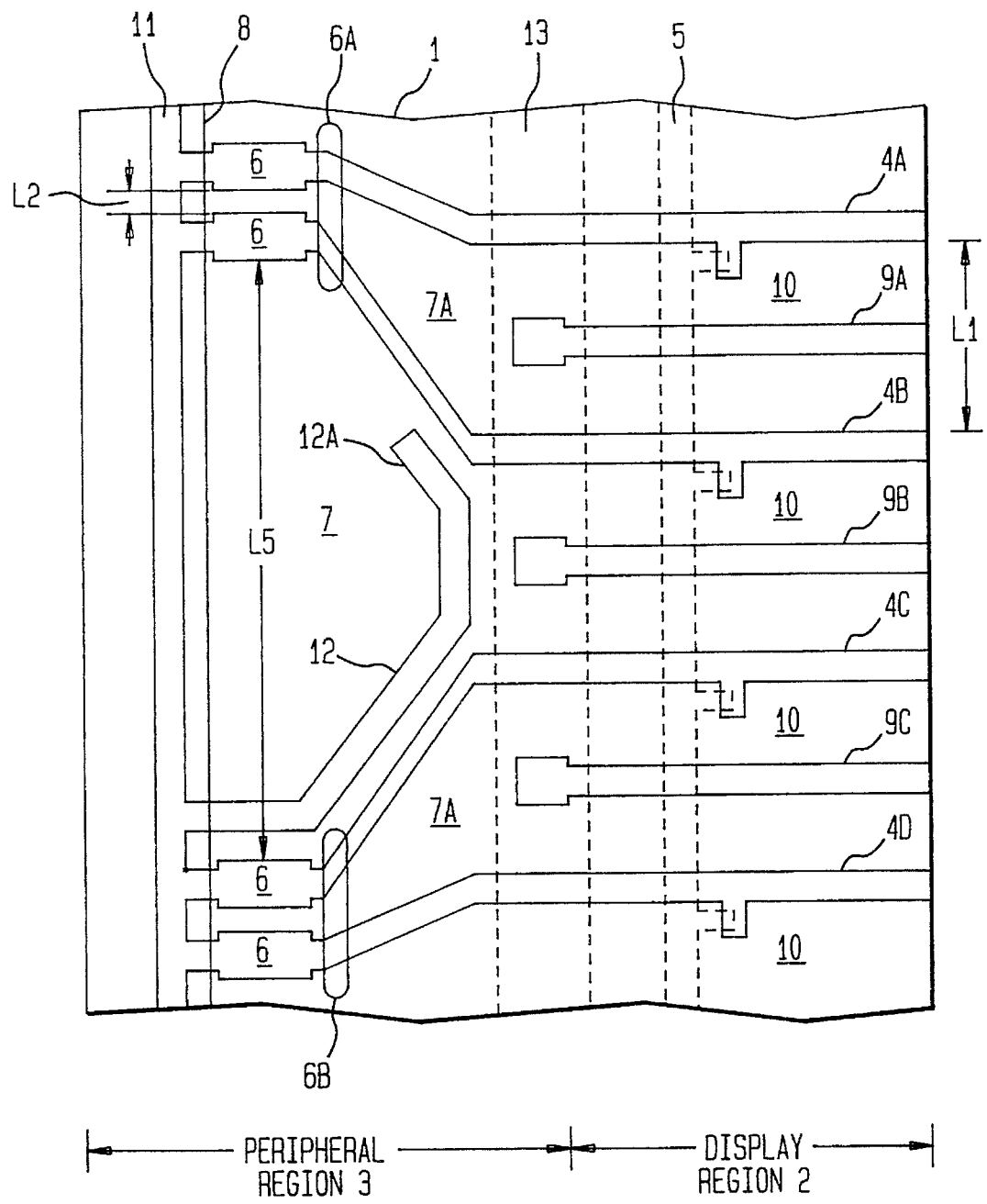
FIG. 1 is a diagram showing a first embodiment of a glass substrate in a liquid crystal display device according to the present invention.
Figure 3:
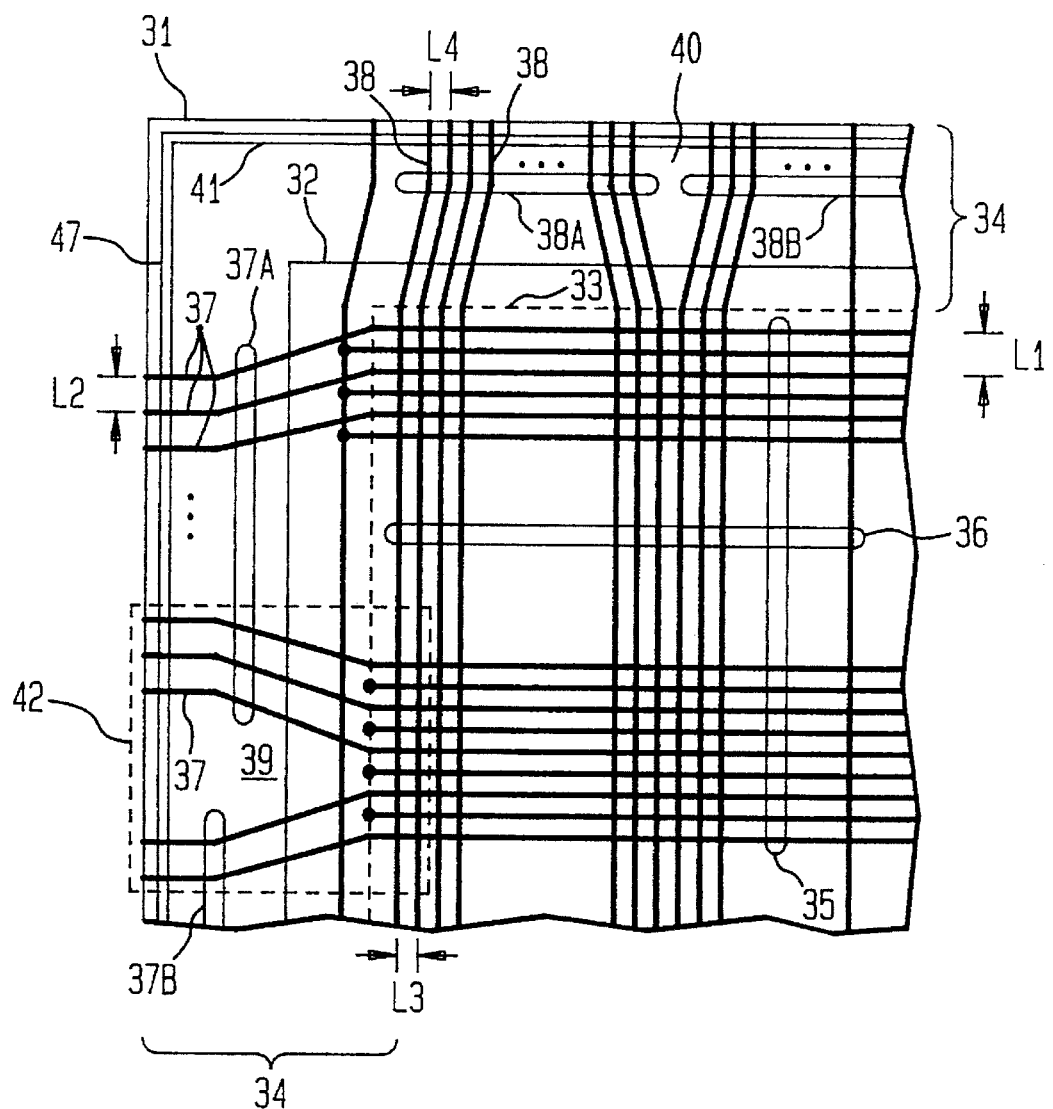
FIG. 3 is a diagram showing a construction of a liquid crystal display device common to the present invention and the prior art.
Figure 4A:
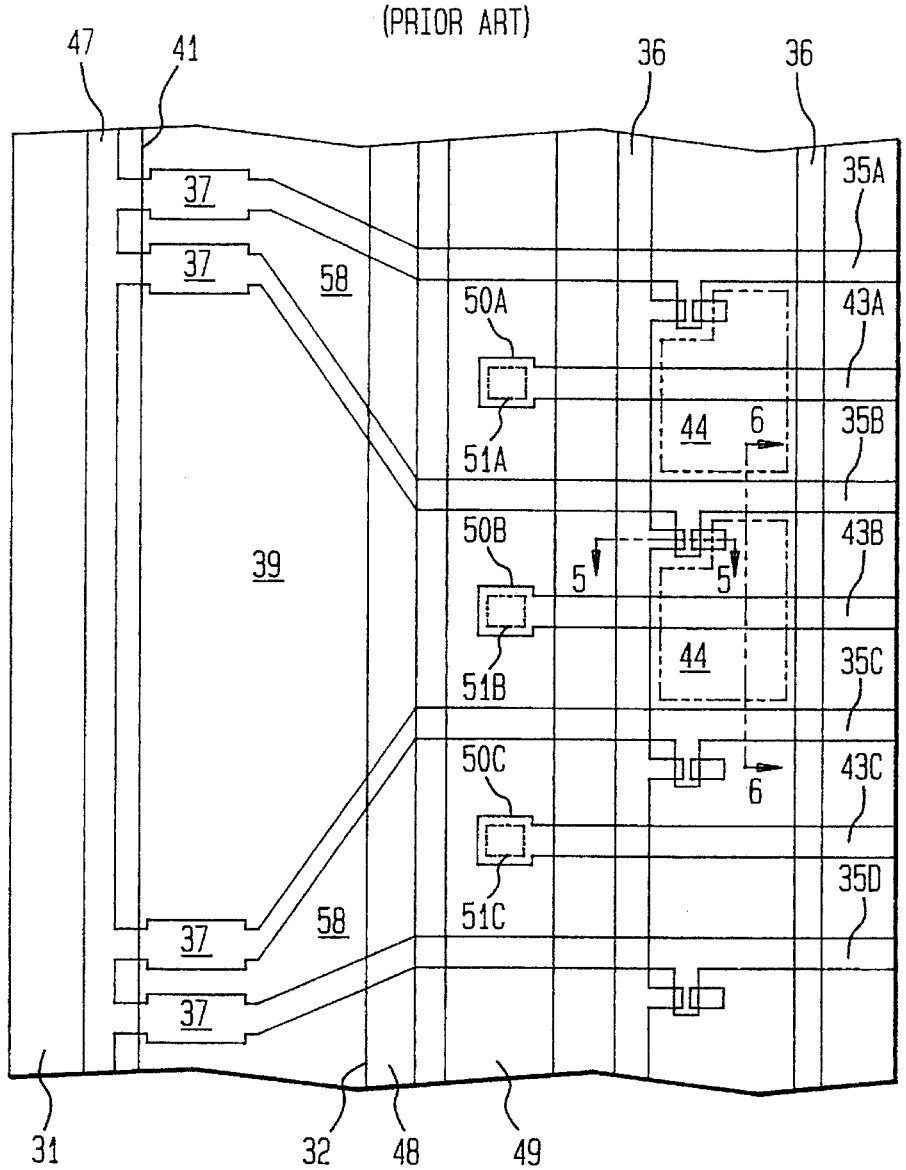
FIG. 4 is an enlarged view of part indicated by the dotted lines 42 in FIG. 3.
Figure 4B:
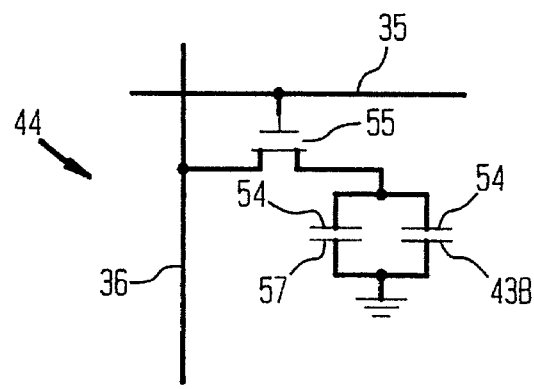

FIG. 1 shows a first embodiment according to the present invention. A glass substrate 1 corresponds to the conventional glass substrate 31 shown in FIG. 3. On the glass substrate 1 gate lines 4A, 4B, 4C, and 4D, gate line connecting terminals 6, a conductive short-circuit line 11, a data line 5, a connection line 13, liquid crystal display elements 10, etc. as in FIG. 3 are formed. In a display region 2 a plurality of the gate lines are formed in parallel with one another in the horizontal direction, reference voltage lines 9A, 9B, and 9C each of which serves as an electrode of a storage capacitor of a liquid crystal display element, are formed between the gate lines, and a plurality of the data lines are formed in parallel with one another in the vertical direction.

Formed in a peripheral region 3 are gate line connecting terminals 6, the short-circuit line 11, and a conductor 12 extending from the short-circuit line 11. The gate lines are each connected to a respective gate line connecting terminal. A flexible circuit board (not shown), which provides gate signals to a liquid crystal display device is connected to the gate line connecting terminals. On the glass substrate 1 in FIG. 1, such data line connecting terminals (as shown in FIG. 3) and a voltage source terminal are formed, and the flexible circuit board, which provides data signals, clock pulses, and a driving voltage, is connected to such terminals.

The distance L2 between the gate line connecting terminals 6 in the peripheral region 3 is smaller than a distance L1 between the gate lines 4A, 4B, and 4C in the display region 2. For example, the distances L1 and L2 are approximately 300 and 60 micrometers, respectively. The gate line connecting terminals 6 are arranged in a plurality of groups 6A and 6B, and a large region 7 exists between the groups. In the region 7 positioning marks for exactly connecting the flexible circuit board to the gate line connecting terminals are formed. A length L5 of the region 7 is approximately 6 millimeters, and accordingly the region 7 is approximately one hundred times as large as a region 7A.

According to the present invention, in the first manufacturing process an alloy of tantalum and molybdenum, tantalum, aluminum, or chromium is deposited and the gate lines 4A, 4B, and 4C, the gate line connecting terminals 6, the conductive short-circuit line 11, the reference voltage lines 9A, 9B, and 9C, and the conductor 12 are formed simultaneously by selective etching through etching masks, on the entire surface of one glass substrate 1.

Figure 6:
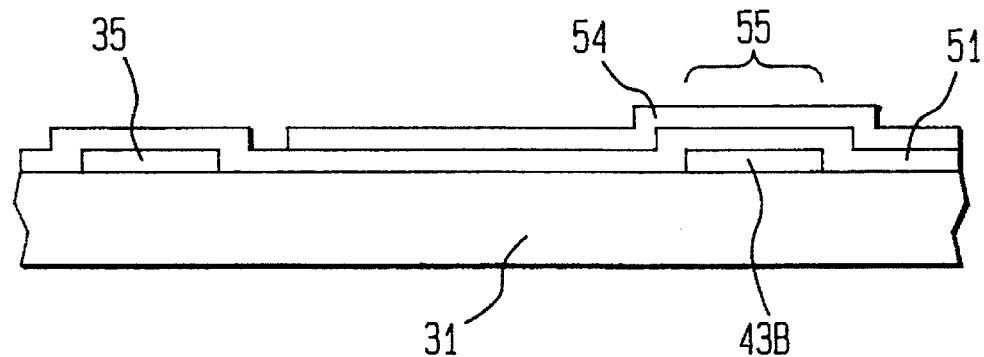
FIG. 6 is a sectional view taken along line 6—6 of FIG. 4.
Figure 7:
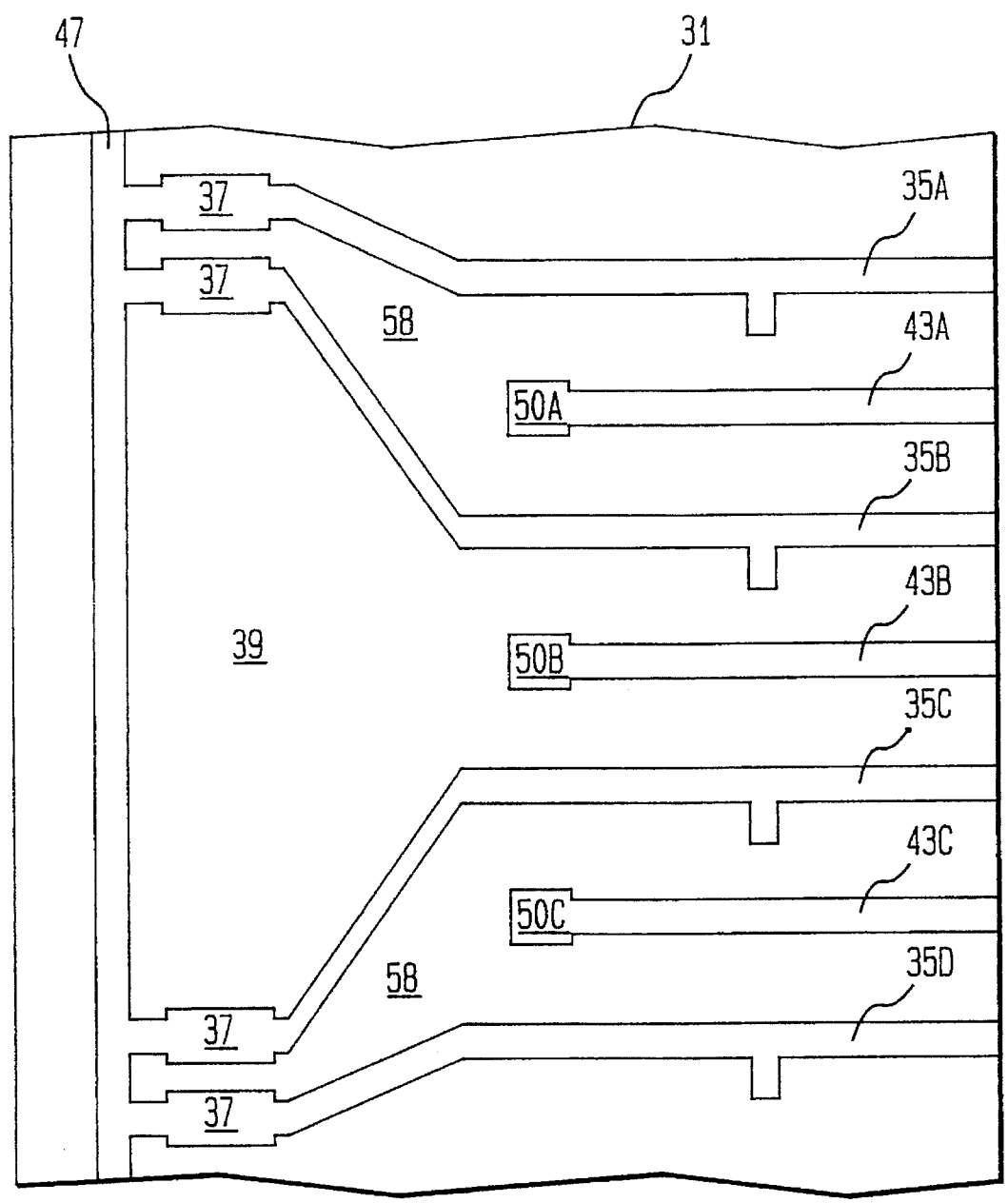
FIG. 7 is a diagram showing a problem in the conventional construction.

The conductor 12 extends from the conductive short-circuit line 11 so as to adjoin the gate line 4C, which is one of two gate lines 4B and 4C enclosing the region 7, reaches between the region 7 and the reference voltage line 9B, and a tip 12A of the conductor 12 is terminated close to the other gate line 4B. This causes electrostatic charges discharged toward the reference voltage line 9B from the region 7 to be stored on the conductor 12 and prevents the electrostatic charges from being discharged toward the reference voltage line 9B, and therefore dielectric breakdown for such a storage capacitor of a liquid crystal display element, as shown in FIG. 6 (which is composed of a reference voltage line, an insulating layer, and an ITO layer) is prevented. It is necessary for the conductor 12 to have a cross sectional area large enough to permit electrostatic charges to flow into the short-circuit line 11. It is preferable that the conductor 12 is 10 to 80 micrometers in width and 500 to 5000 angstroms in thickness.

Figure 5:
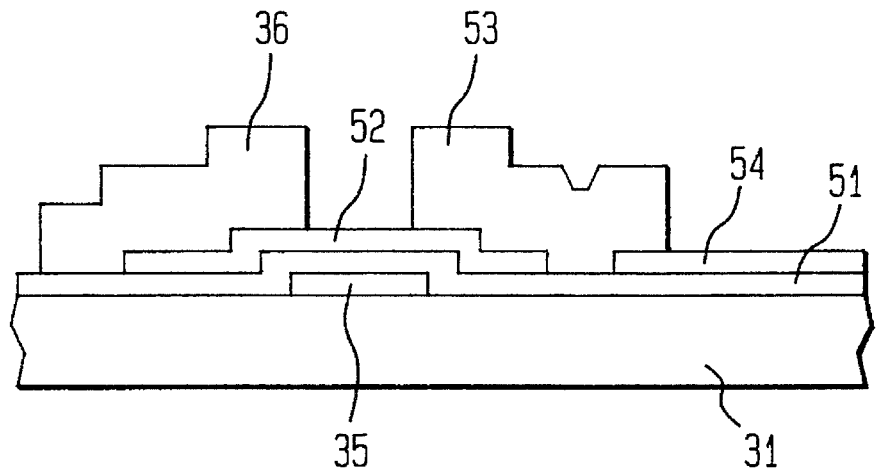
FIG. 5 is a sectional view taken along line 5—5 of FIG. 4.

In the second manufacturing process, an insulating layer corresponding to the insulating layer 51 in FIG. 5 and FIG. 6 is deposited on the entire surface. The material for the insulating layer is a silicone oxide or a nitrogen oxide.

In the third manufacturing process, an amorphous silicon semiconductor layer as shown in FIG. 5 is formed on the insulating layer.

In the fourth manufacturing process, an ITO layer, which serves as a display electrode, as shown in FIG. 5 is formed on the insulating layer.

In the fifth manufacturing process, for example, aluminum is deposited on the entire surface and selectively etched, and a data line and drain electrode, as shown in FIG. 5, are formed. At the same time, the aluminum short-circuit line which extends along the short-circuit line in FIG. 1 and extends in the horizontal direction along a horizontal edge of the glass substrate, as shown in FIG. 3, is formed. Before aluminum is deposited, an opening is formed on the insulating layer for the short-circuit line 11 which is made of the same material as the gate lines so that the short-circuit line 11 can be electrically connected to the aluminum short-circuit line. This results in the interconnection of all gate and data lines through the short-circuit line. The interconnection through the short-circuit line is not shown since it is well known. In this manner, dielectric breakdown for the thin-film transistor of the liquid crystal display element is prevented.

In the sixth manufacturing process, an insulating protective layer, an orientation film, etc. are formed. Being well known, they are not shown.

In the seventh manufacturing process, a color filter, a black matrix enclosing the color filter, an orientation film etc. are formed on the other glass substrate. Being also well known, the process is not shown.

In the eighth manufacturing process, both glass substrates are overlapped with each other at a predetermined distance as shown in FIG. 1 and sealed. A liquid crystal material is then enclosed therein.

Being well known, the above second to eighth processes are not explained in further detail.

As described above, according to the present invention, the conductor 12 is formed simultaneously with the gate lines 4A, 4B, 4C, and 4D, the gate line connecting terminals 6, the conductive short-circuit line 11, and the reference voltage lines 9A, 9B, and 9C in the first process. The conductor 12 is extended from the short-circuit line 11 and formed between the region 7 and the reference voltage line 9B which faces the region 7.

The same construction that FIG. 5 and FIG. 6 show is obtained at the time when the fourth process is complete. In that stage, even if electrostatic charges are produced and discharged toward the reference voltage line 9B, the electrostatic charges are absorbed into large capacitance produced by the short-circuit line 11, the gate lines, and the data line through the conductor 12 and therefore do not reach the reference voltage line 9B, which prevents dielectric breakdown of the storage capacitor as described above.

Figure 2:
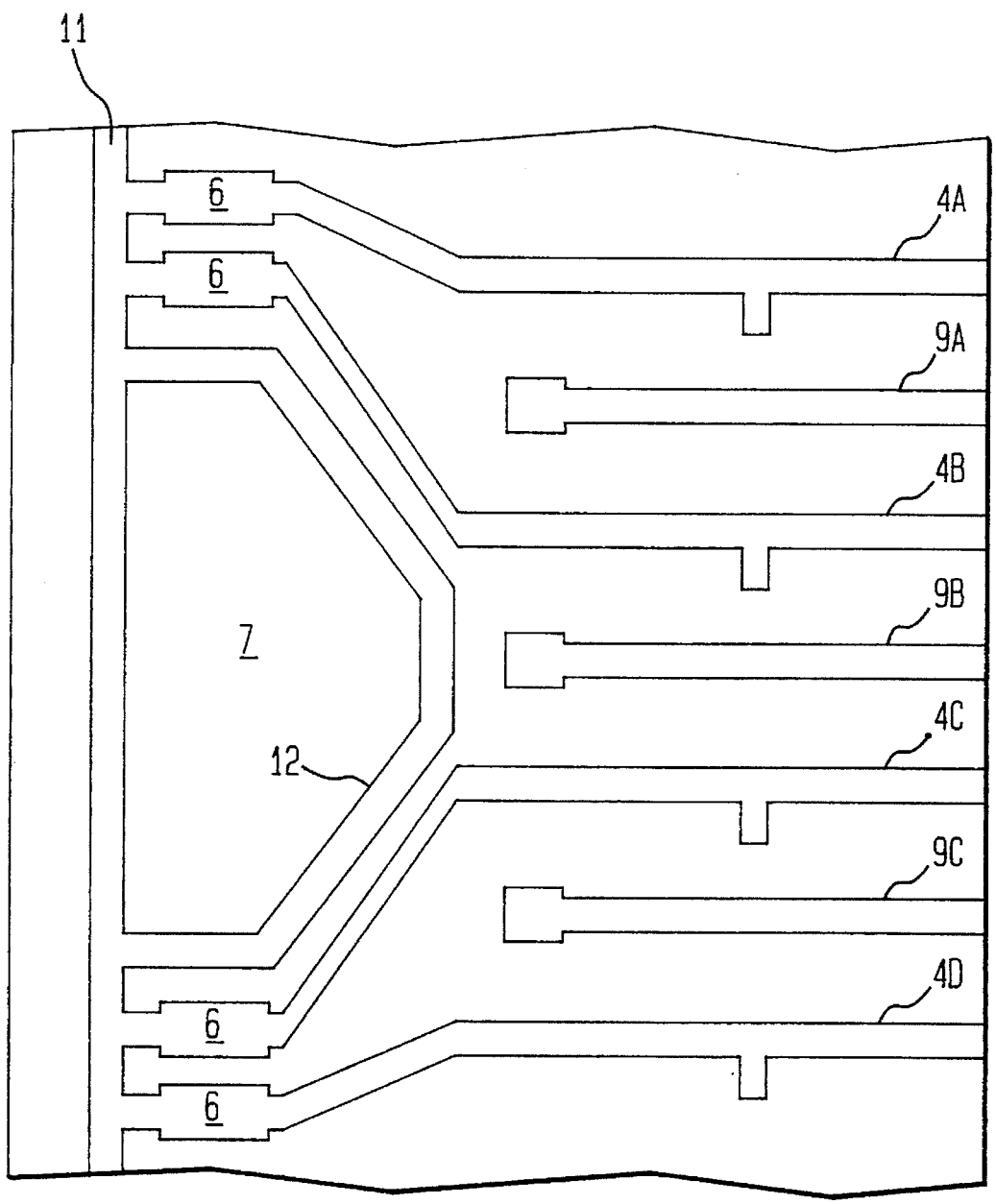
FIG. 2 is a diagram showing a second embodiment of a glass substrate in the liquid crystal display device according to the present invention.

FIG. 2 shows a second embodiment in accordance with the present invention. In the second embodiment, the conductor 12 is formed along two gate lines 4B and 4C adjoining the region 7 so as to enclose the region 7 and both ends of the conductor are connected to the short-circuit line 11.

We claim:

1. In a liquid crystal display device including a display region in which a plurality of liquid crystal display elements are formed in a matrix and a peripheral region surrounding the display region, wherein said display region includes a plurality of gate lines arranged in parallel with one another and a plurality of reference voltage lines each of which is formed between corresponding pair of adjacent the gate lines and serves as an electrode for storage capacitors of associated ones of said liquid crystal display elements, and said peripheral region includes a plurality of connecting terminals which are separated from each other by a distance smaller than a distance between adjacent gate lines in said display region, said connecting terminals being arranged in a plurality of groups, said gate lines each being connected to a respective connecting terminals, and a conductive short-circuit line is formed along said peripheral region so that said connecting terminals are short-circuited, the improvement comprising a conductor extending from said conductive short-circuit line and formed between one of said plurality of reference voltage lines and a region adjacent said one of said plurality of reference voltage lines which region is between adjacent groups of connecting terminals connected to gate lines.

2. The liquid crystal display device according to claim 1, wherein said short-circuit line, said gate lines, said reference voltage lines, and said conductor are formed on a glass substrate.

3. The liquid crystal display device according to claim 2, wherein said short-circuit line, said gate lines, said reference voltage lines, and said conductor are made of a metallic material selected from the group consisting of an alloy of tantalum and molybdenum, tantalum, aluminum, and chromium.

4. The liquid crystal display of claim 1, wherein said groups of terminals connected to gate lines are disposed along one side of said display.

5. The liquid crystal display of claim 4, wherein said groups of gate lines are disposed along a single side of said display.

6. The liquid crystal display of claim 1, wherein the conductor extends from a portion of said short-circuit line extending along a first side of said display, parallel to a connecting terminal of a first group of said adjacent groups of connecting terminals connected to gate lines, parallel to a respective gate line, and adjacent an end of said one of said plurality of reference voltage lines.

7. The liquid crystal display of claim 6, wherein said conductor further extends along a second gate line and a respective second connecting terminal, said second gate line and said respective second connecting terminal belonging to a second group of said adjacent groups of connecting termnals connected to gate lines.

8. The liquid crystal display of claim 7, wherein said conductor further extends back to said short-circuit line along said first side of said display.

9. The liquid crystal display of claim 1, wherein a first region between said short-circuit line and said conductor is larger than a second region between adjacent gate lines connected to one of said first group or second group of connecting terminals.

10. The liquid crystal display of claim 9, wherein said first region is one hundred times larger than said second region.

* * * * *